United States Patent [19]

Muellenberg

[11] Patent Number: 5,067,847
[45] Date of Patent: Nov. 26, 1991

[54] CLAMPING SET FOR TRANSMITTING TORQUE AND/OR AXIAL FORCES

[76] Inventor: Ralph Muellenberg, Im Wiesengrund 6, D-4048 Grevenbroich 12, Fed. Rep. of Germany

[21] Appl. No.: 426,598

[22] Filed: Oct. 23, 1989

[30] Foreign Application Priority Data

Oct. 21, 1988 [DE] Fed. Rep. of Germany ....... 3835894

[51] Int. Cl.⁵ ............................................. B25G 3/20
[52] U.S. Cl. .................................. 403/370; 403/371; 403/342
[58] Field of Search ................. 403/370, 371, 16, 342

[56] References Cited

U.S. PATENT DOCUMENTS

| | | |
|---|---|---|
| 1,489,976 | 4/1924 | Brown . |
| 1,732,355 | 10/1929 | Graig . |
| 2,475,042 | 7/1949 | McCloskey ................. 403/370 X |
| 2,617,672 | 11/1952 | Nichols ........................ 287/20.3 |
| 3,614,140 | 10/1971 | Nestor .......................... 287/52.06 |
| 4,134,699 | 1/1979 | Schafer et al. ..................... 403/13 |
| 4,655,630 | 4/1987 | Rinehart ......................... 403/342 |

FOREIGN PATENT DOCUMENTS

| | | |
|---|---|---|
| 0007217 | 1/1980 | European Pat. Off. . |
| 3444608 | 6/1986 | Fed. Rep. of Germany . |
| 624872 | 7/1949 | United Kingdom . |
| 704139 | 2/1954 | United Kingdom . |
| 758899 | 10/1956 | United Kingdom . |

Primary Examiner—Andrew V. Kundrat
Attorney, Agent, or Firm—Foley & Lardner

[57] ABSTRACT

A clamping set is provided wherein elastic deformation of the peripheral collars is no longer necessary to produce engagement of the same. The screw ring can be pushed across the cylindrical outer peripheral surface of the outer taper ring until its inwardly projecting peripheral collar bears against the outwardly projecting peripheral collar of the outer taper ring. These can then be pushed together across the inner taper ring from its thin-walled end until the inner thread of the screw ring comes into contact with the external thread of the inner taper ring and fastening begins. All interacting parts can, thus, be designed to be substantially stronger, since they no longer need to be deformed to produce engagement. Accordingly, the forces which can be applied are also greater.

17 Claims, 4 Drawing Sheets

CLAMPING SET FOR TRANSMITTING TORQUE AND/OR AXIAL FORCES

BACKGROUND OF THE INVENTION

1. Field of the Invention

The present invention relates to clamping sets and more particularly, to a clamping set for transmitting torque and/or axial forces.

2. Discussion of the Related Art

German Offenlegungsschrift 3,444,608 discloses a clamping set similar to that of the present invention. According to this reference, a thread is made on the thin-walled end of an inner taper ring, and a screw ring, which has a radially outwardly projecting peripheral collar, grips behind a radially inwardly projecting peripheral collar of the outer taper ring. The outer taper ring is slightly extended radially and elastically in order to facilitate engagement. When the clamping set is fastened, the outer taper ring, with its end face bearing against the screw ring, is pressed up onto the inner taper ring toward the thick-walled end thereof. During disengagement, an undercut portion is used, which is located at the peripheral collars of the screw ring and the outer taper ring.

A peripheral collar which is brought into engagement on this undercut while one of the taper rings extends elastically can only have a small height. Accordingly, the tensile force which can be applied through such a peripheral collar is limited. The generall small step tends to deform under high surface pressures. Further, at self-locking taper angles, which are usually necessary to produce high clamping forces, the release forces are virtually as large as the clamping forces. Therefore, the clamping set disclosed in German Offenlegungsschrift 3,444,608 is suitable only for limited torque applications.

Moreover, a disadvantage of this conventional clamping set is that the screw ring is essentially located in front of the front end of the outer taper ring, i.e. axially outside the taper rings, and thus increases the overall axial length of the clamping set.

European preliminary published specification 007,217 discloses a congeneric clamping set in which the arrangement of the thread relative to that of the taper surfaces is the same, but the screw ring has a cylindrical extension which reaches across the end of the outer taper ring and, with an inwardly projecting collar, engages into an outer peripheral groove in the outer taper ring. Here, too, engagement is produced under elastic deformation of at least one part of the combination, and the engagement height at the undercut is accordingly limited. The clamping set is fastened when the front end of the extension bears against a flank of the groove in the outer taper ring. As a result, when the axial pressure forces for fastening are applied, there is a risk of buckling and other deformations because the extension tends to deform when producing engagement and because of the resulting thinness of the wall of the extension.

SUMMARY OF THE INVENTION

Accordingly it is an object of the invention to provide a clamping set wherein larger clamping forces are possible.

The foregoing and additional objects are attained by providing a clamping set wherein elastic deformation of the peripheral collars is no longer necessary to produce engagement of the same. The screw ring can be pushed across the cylindrical outer peripheral surface of the outer taper ring until its inwardly projecting peripheral collar bears against the outwardly projecting peripheral collar of the outer taper ring. These can then be pushed together across the inner taper ring from its thin-walled end until the inner thread of the screw ring comes into contact with the external thread of the inner taper ring and fastening begins. The screw ring can, of course, also be pushed across the already joined inner and outer taper rings. All interacting parts can, thus, be designed to be substantially more robust, since they no longer need to be deformed to produce engagement. Accordingly, the forces which can be applied are also greater.

If the interacting taper surfaces of the inner and outer taper ring have a taper angle which is in the self-locking range, the clamping set does not release itself automatically after the screw ring has been released. On the contrary, forces opposed to the release direction have to be applied in order once again to push the outer taper ring away from the inner taper ring.

The screw ring can also be tightened to the extent to which torque can be applied by available means. The peripheral collars then bear against one another with a certain force, and a certain fastened state is achieved. However, final fastening then follows hydraulically by actuating piston/cylinder units and pulling the outer taper ring further onto the inner taper ring.

This principle can also be used to release the clamping set by piston/cylinder units which act against the component sitting on the cylindrical outer peripheral surface of the outer taper ring. In this way, a pressure force is produced which is transmitted via the screw ring to the inner taper ring and has the effect of pushing the taper rings away from one another.

The clearance is provided so that no friction occurs at the inner periphery of the inwardly projecting peripheral collar of the screw socket during tightening. Also, the screw connection permits axial adjustment of the outer component and is particularly convenient where the securing of outer components to vertical bars or columns is concerned.

In an alternative embodiment, the inner taper ring is doubled, and the remaining clamping elements are also doubled. This enables a shaft or pipe coupling to be formed, the shaft ends being inserted from the two ends into the double taper ring until the front ends face one another in the center. The two screw rings can then be tightened independently of one another.

In order to use the area of the peripheral collar of the outer taper ring to transmit radial clamping forces, beveling is provided, which leads to radial force components from the axial forces of the screw ring.

In order to ensure that the largest possible proportion of the longitudinal forces produced by the screw ring will be converted into radial clamping forces and prevent an unacceptable loss in deformation energy for overcoming the clearance, the taper rings may be provided with a longitudinal slot.

Although the invention is not restricted to self-locking taper angles, in the preferred embodiment such taper angles are provided so that the highest possible torque can be transmitted. The release forces then required can be applied either by additional screws or by screwing the screw ring itself.

When the screw ring is tightened, the inner taper ring generally does not slip so that no special means are needed for rotatably securing this part on the shaft or the inner component. However, according to an alternative embodiment, in order to be independent of the adhesion of the inner taper ring on the shaft and also to bring about a torque conversion, a turning tool supported on the outer component may be provided. When the clamping set is fastened, the torque then is applied only to forces remaining with the clamping arrangement so that slipping is no longer caused.

In another embodiment, the turning tool comprises a pinion having a pitch circle diameter which is substantially smaller than the diameter of the screw ring. If the screw ring is turned at the pinion by, for example, a wrench or a crank, a torque conversion takes place in accordance with the diameter ratio. The mating teeth for the pinion can be provided directly on the outer periphery of the screw ring or on a special tool which can be rotatably fixed on the screw ring and whose outer periphery then forms the tooth system.

The tool can generally only be slipped onto the screw ring from the side, which screw ring then has a polygonal actuating periphery onto which the tool can be placed in various angular positions. The tooth system, thus, does not need to extend over the entire periphery, but needs only to cover a circular arc corresponding to the angular difference between two different positions of the tool on the screw ring.

It is also possible to mount and support the pinion on the outer component, in which arrangement the pin can be rotatable in the bore or, when the pinion is rotatable about the pin, can sit in the bore.

Torque supports may be used if the torque limit is exceeded, that is, if the clamping set slips. Depending on the direction of rotation, these supports lead either to the release of the screw ring, in order to avoid damage to the shaft and the inner taper ring, or alternatively, to firmer tightening of the screw ring and, thus, the clamping set.

DETAILED DESCRIPTION OF THE PREFERRED EMBODIMENTS

Figure 1:
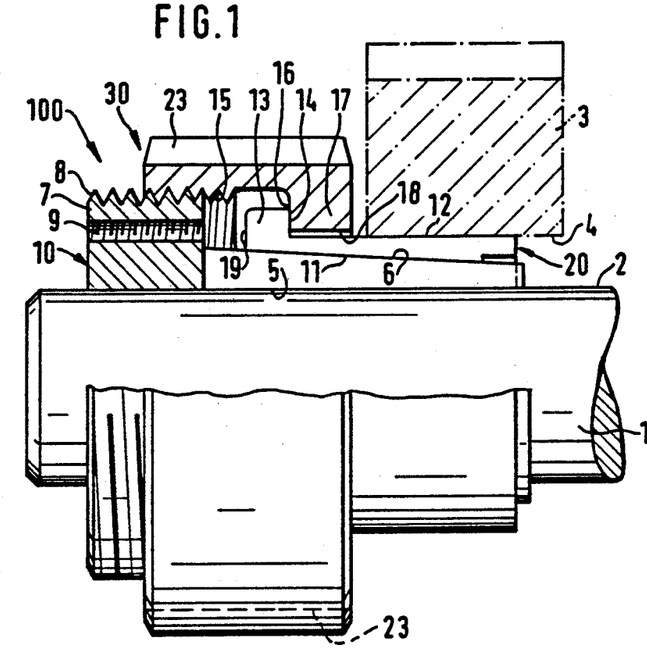
FIG. 1 shows a view, partly in longitudinal section, of a first embodiment of a clamping set according to the present invention.

As shown in FIG. 1, the present invention contemplates a clamping set, designated generally by the reference numeral 100, which serves firmly to clamp an outer component 3 on a shaft 1 having a cylindrical outer peripheral surface 2. The component 3 is in the form of a gear having a recess with a cylindrical inner peripheral surface 4 which is at a radial distance from the outer peripheral surface 2. The right hand end (according to FIG. 1) of the clamping set 100 reaches into the radial space between the cylindrical surfaces 2 and 4.

The clamping set 100 comprises an inner taper ring 10 which, with its cylindrical inner peripheral surface 5, rests on the cylindrical outer peripheral surface 2 of the shaft 1. The inner taper ring 10 also has a tapered outer peripheral surface 6 in the self-locking range. Adjoining the thick-walled end of the inner taper ring 10, i.e. the end situated on the left in FIG. 1, is a radially outwardly projecting peripheral margin 7 which has a thread 8 on the outer periphery thereof. Below the thread 8, withdrawal threads 9 are formed which are distributed over the periphery in the part of the peripheral margin 7 projecting radially beyond the thick-walled end of the taper surface 6. These withdrawal threads allow a fastened clamping set to be released.

Arranged on the outer taper surface 6 of the inner taper ring 10 is an outer taper ring 20 which has a tapered inner peripheral surface 11 of the same taper angle as the outer taper surface 6 and has a cylindrical outer peripheral surface 12 which bears against the inner peripheral surface 4 of the outer component 3.

Provided at the thin-walled end of the outer taper ring 20 is a radially outwardly projecting peripheral collar 13 which protrudes beyond the cylindrical outer peripheral surface 12. The bearing surface 14 of the outer peripheral surface 12, which faces the thick-walled end and is perpendicular to the axis of the shaft 1, is freely accessible to a ring which may be pushed on from the thick-walled end.

The peripheral collar 13 of the outer taper ring 20 is surrounded by a screw ring 30 which at one end has an internal thread 15 which interacts with the external thread 8 on the outer periphery of the peripheral margin 7. The inside diameter of the internal thread 15 is larger than the outside diameter of the peripheral collar 13 so that the screw ring 30 can be pushed from the right, according to FIG. 1, across the outer taper ring 20 and the internal thread 15 can pass over the peripheral collar 13.

At the other end, the screw ring 30 has a radially inwardly projecting peripheral collar 17 which grips radially behind the peripheral collar 13 on the side remote from the threads 8, 15 and bears on the bearing surface 14 of the peripheral collar 13 with a bearing surface 16 which is perpendicular to the axis of the shaft 1. The inner peripheral surface 18 of the peripheral collar 17 is cylindrical and defines a slight clearance relative to the outer peripheral surface 12 of the outer taper ring 20 in order to avoid friction therebetween.

When the clamping set 100 is assembled, the outer taper ring 20 can be pushed on to the inner taper ring 10 and the screw ring 30 can then be pushed across from the right according to FIG. 1 and brought into engagement at the threads 8, 15. The outer taper ring 20 is pulled from the left onto the inner taper ring 10 by tightening the screw ring 30, as a result of which, radial expansion of the outer taper ring 20 and, thus, fastening against the inner peripheral surface 4 takes place.

To avoid excessive losses of axial clamping force applied by the screw ring 30, the outer taper ring 20 has a continuous radial slot at one location, which is indicated by the lack of hatching, whereas the inner taper ring 10 is slotted in the area of the outer surface 6 at several locations distributed uniformly over the periphery thereof.

To release the clamping set 100 provided with self-locking taper surfaces 6, 11, withdrawal screws are screwed into the tapped withdrawal holes 9, which withdrawal screws are set in front of the end face 19, opposite the bearing surface 14, of the peripheral collar 13 of the outer taper ring 20. However, the screw ring 30, with its front end which faces the outer component 3, can also be brought to bear against this outer component 3 and release of the clamping set 100 can be effected by screwing further in this direction.

Figure 2:
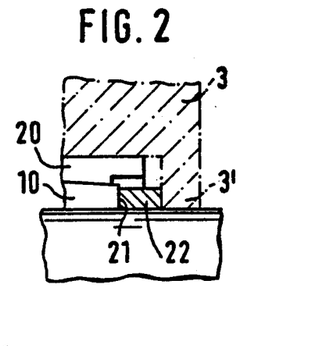
FIG. 2 shows a partial view from FIG. 1 with a convenient modification.

When the clamping set 100 in FIG. 1 is fastened, the outer component 3, which is secured in place on the shaft 1, tends to follow the axial displacement of the outer taper ring 20 relative to the inner taper ring 10 sitting firmly on the shaft 1. In many cases this is of no importance. However, if it is desirable for the outer component 3 to remain stationary in the axial direction of the shaft 1 during fastening of the clamping set 100, an arrangement according to FIG. 2 can be selected. Here, the outer component 3 has an extension 3' which projects radially inwardly toward the front end 21 of the inner taper ring 20 situated at the thin-walled end thereof and is supported either directly against the end face 21 or against the end face 21 via an intermediate ring 22. When the outer taper ring 20 according to FIG. 2 is displaced to the left, the outer component 3 is no longer carried along relative to the shaft 1.

In order to facilitate application to the screw ring 30 of the torque necessary for fastening, axially parallel grooves 23 are provided over the periphery of the screw ring 30, which grooves are engageable by an appropriate turning tool.

Figure 3:
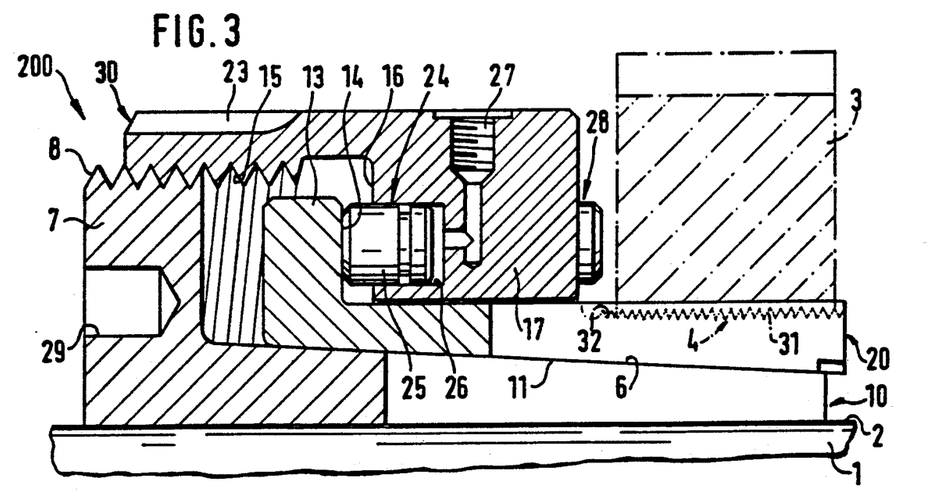
FIG. 3 shows a view as in FIG. 1 of a second embodiment of the present invention.

In the clamping set 200 in FIG. 3, parts which correspond in function are identified by the same reference numerals.

The difference between the clamping set 200 and the clamping set 100 is that, in the clamping set 200, a plurality of small piston/cylinder units 24 are distributed over the periphery of the bearing surface 16 and act parallel to the axis of the shaft 1, of the peripheral collar 17 of the screw ring 30. The pistons 25 of the piston/cylinder units 24 are advanced out of the associated cylinder bore 26 in the peripheral collar 17 toward the bearing surface 14 of the peripheral collar 13 when a hydraulic pressure medium is introduced via the connecting passages 27. The outer taper ring 20 is thereby drawn up to the left according to FIG. 3 onto the inner taper ring 10. The force is transmitted to the inner taper ring 10 via the screw ring 30 and the threads 8, 15. The pistons 25, in retracted position, may protrude slightly from the bearing surface 16, or may be completely concealed beneath the bearing surface 16.

Thus, according to the embodiment of FIG. 3, the screw ring 30 can be tightened manually until it is fastened to a certain extent, whereupon further fastening takes place hydraulically through the pistons 25.

The clamping set 200 can be released by similar piston/cylinder units 28, which, however, act on the other side of screw ring 30 and bear against the outer component 3 clamped in place on the outer taper ring 20. When pressure is exerted against the left hand side (according to FIG. 3) of the outer component 3, slipping will occur at the taper surfaces 6, 11 and the clamping set 200 will thus be released.

At the beginning of fastening, when the inner taper ring 10 is not yet firmly seated on the shaft 1, bores 29 in the peripheral margin 7 may be used with a suitable turning tool to counteract the torque applied to the screw ring 30.

In FIG. 3, as an alternative, broken lines indicate that the recess 4, instead of being provided with a smooth, cylindrical inner peripheral surface, can also be provided with an internal thread 31 which is screwed onto an external thread 32 on the right hand end, (as shown in FIG. 3) i.e., the thick-walled end, of the outer taper ring 20. The outer component 3 can be axially adjusted within a certain area. When the clamping set 200 is fastened, the outer component 3 is secured in position on the outer taper ring 20.

Figure 4:
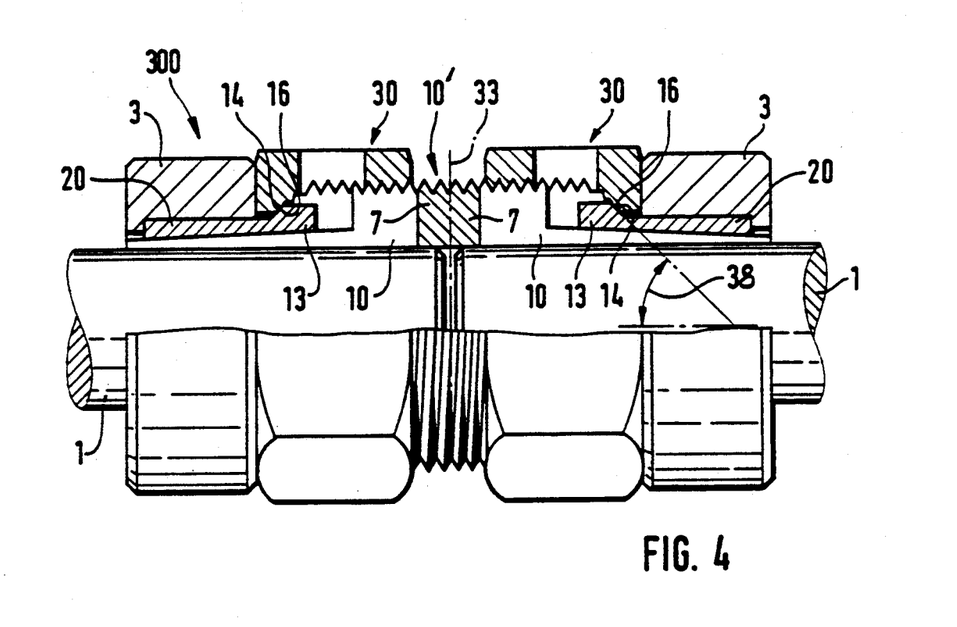
FIGS. 4 and 5 show views, as in FIG. 1, of further embodiments of the present invention.

Referring now to FIG. 4, a clamping set 300 is shown which is designed in mirror image relative to a center plane 33 at right angles to the axis of the shaft 1. The double taper ring 10' consists of two inner taper rings 10 in accordance with FIG. 1 which are integrally connected to one another along their peripheral margins 7. The remaining elements are also doubled. The clamping set 300 serves as a shaft coupling. Two shafts 1 engage end-to-end from opposite sides into the double taper ring 10' and are separately connected to the double taper ring 10' by actuating the clamping rings 30, 30. In this case, the "outer components 3" are thick-walled clamping rings which merely apply the peripheral stress for producing the needed radial clamping force.

In this embodiment, the bearing surfaces 14, 16 of the outer taper ring 20 and the screw ring 30, respectively, are not perpendicular to the axis of the shaft, as in the embodiment in FIGS. 1 and 3, but instead are inclined, i.e. tapered.

In the embodiment shown in FIG. 4, the angle 8 of the bearing surfaces relative to the axis of the shaft 1 is about 45°. Consequently, a certain radial contact pressure is also applied to the outer taper ring 20 in the area of the peripheral collar 13, thereby contributing to the torque which can be transmitted.

Figure 5:
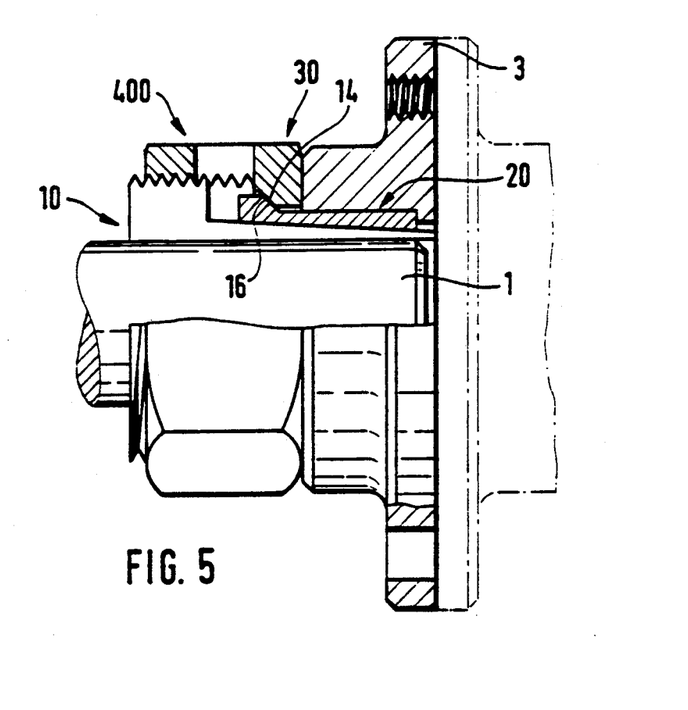
Figure 6:
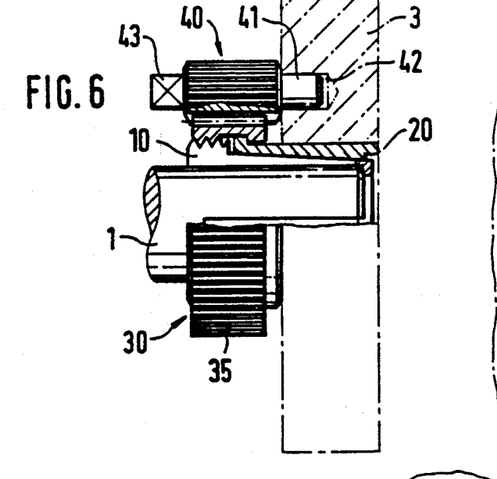
FIG. 6 schematically shows the function of a turning tool.
Figure 7:
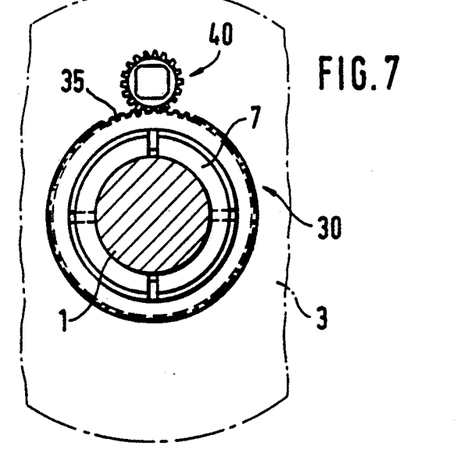
FIG. 7 shows a partial view from the left according to FIG. 6.

FIG. 5 shows an exemplary embodiment in which the outer component 3 is designed as a coupling flange which can be fixed in the end area of a shaft 1 by means of the clamping set 400. In the clamping set 400, the bearing surfaces 14, 16 also have the inclination mentioned with reference to FIG. 4.

A common feature of the clamping sets 300, 400 in FIGS. 4 and 5 is that the screw rings 30 are of a hexagonal configuration on the outer periphery, like a nut, in order to be engaged by a turning tool.

To tighten the screw ring 30, a special turning tool can also be provided according to FIGS. 6 to 9. In the embodiment in FIGS. 6 and 7, the screw ring 30, has a tooth system 35 on its outer periphery with which the tooth system of a pinion 40 meshes. The pinion 40 with a pin 41 is rotatably mounted in an axially parallel bore 42 defined in the outer component 3. At the other end of the pinion is an extension 43 with flats on which a crank or a wrench can act. In the shown embodiment, the diameter of the pitch circle of the tooth system of the pinion 40 is only about one quarter of the pitch circle of the tooth system 35 so that, at a certain torque for turning the pinion 40, about four times the torque is applied to the screw ring 30.

Figure 8:
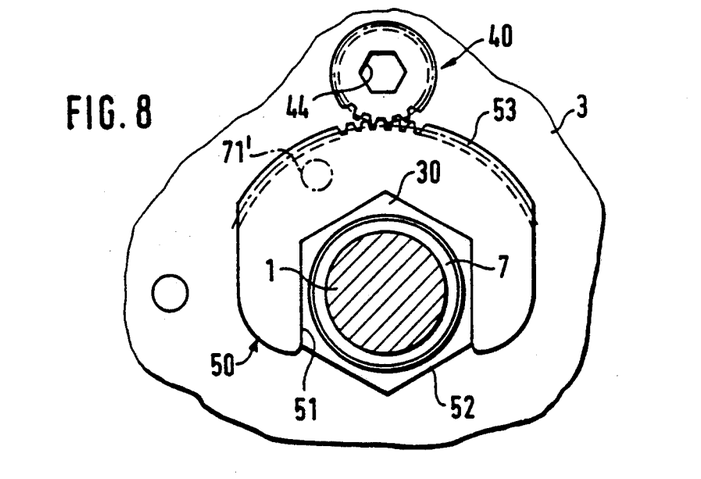
FIGS. 8 and 9 show partial views corresponding to FIG. 7 of further embodiments of the turning tool.

An alternative embodiment is shown in FIG. 8. A tool 50 is provided which has a wrench jaw 51 which fits onto an outer hexagon 52 of the screw ring 30. On the side remote from the jaw 51, the tool 50 has a tooth system 53 with which the tooth system of the pinion 40 meshes. When the pinion 40 is turned at the hexagonal socket 44, the screw ring 30 is also turned, as in the embodiment in FIGS. 6 and 7. The advantage of this embodiment is that the tool 50 can be slipped from the side onto the screw ring 30 and therefore no open end of the shaft 1 is required. Also, only one tooth system 53 need be provided, namely on the tool 50, whereas in the embodiment in FIGS. 6 and 7 every individual screw ring requires a tooth system.

When, during tightening of the screw ring 30 according to FIG. 8, the pinion has arrived at the end of the tooth system 53 which extends only over an angle of about 90°, the tool 50 is accordingly transposed on the screw ring 30.

Figure 9:
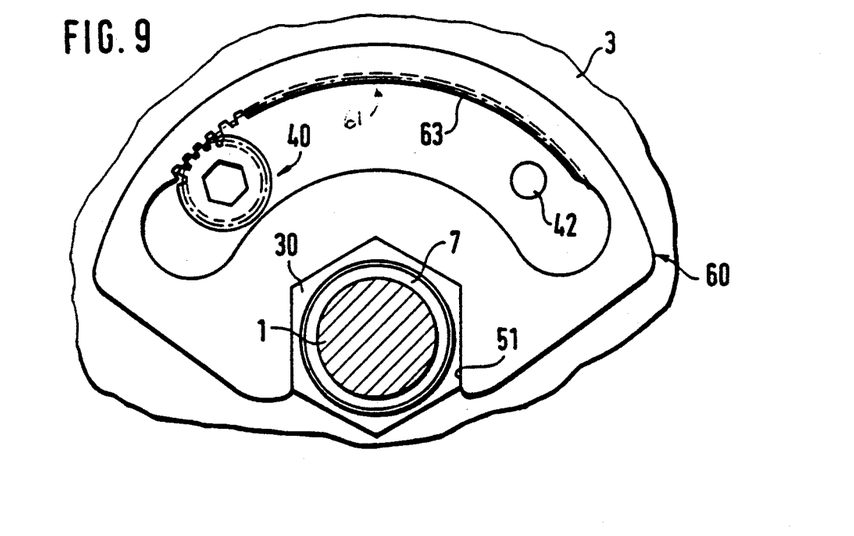

The tool 60 in FIG. 9 differs from the tool 50 in that, instead of the external tooth system 53, a circular recess 61 having a tooth system 63 made on the radially outer boundary is provided, with which tooth system the pinion 40 meshes from the inside. The circular recess 61 of the tool 60 is of such a width that the pinion 40 meshes with the outer tooth system 63 and, due to the inner boundary of the circular recess 61, cannot jump out.

Figure 10:
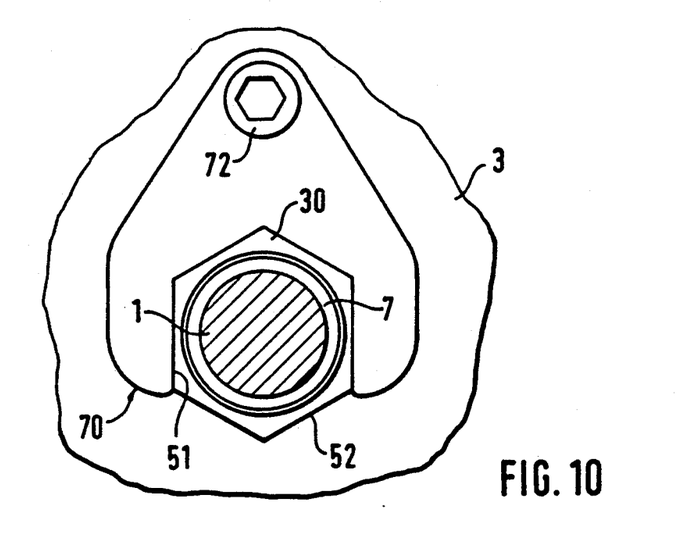
FIGS. 10 and 11 show views in accordance with FIGS. 7 and 6, respectively, of an embodiment with a torque support.
Figure 11:
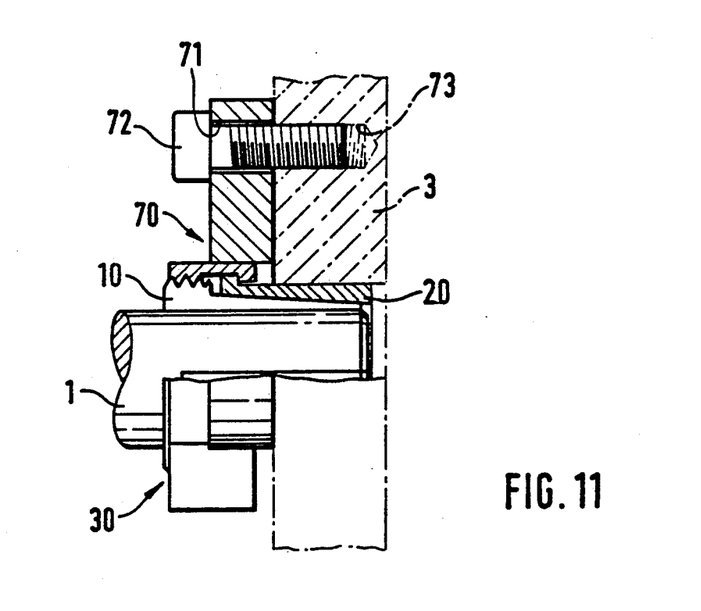

FIGS. 10 and 11 show a torque support 70 which is attached to the fully fastened clamping set 6, 7, 30. In the shown embodiment, the screw ring 30 has an external hexagon 52, and the torque support 70 is designed as a plate having a wrench jaw 51 which fits onto the external hexagon 52. A perforation 71 is provided at right angles to the plate plane, through which a screw 72 into a tapped hole 73 in the outer component 3. The torque support 70 thus rotatably fixes the screw ring 30 to the outer component 3. More importantly, however, if the torque limit of the clamping set is exceeded, that is, if the clamping set starts to slip on the shaft 1, the outer component carries the torque support 70 and thus the screw ring 30 along with it in the direction of the torque. As a result, depending on the arrangement of the threads, the taper rings 6, 7 either loosen or tighten to a greater extent. Loosening can be desired in order to effect immediate relief in the event of excessive torque and to prevent the interacting cylindrical surfaces of the shaft 1 and the taper ring 7 from being ruined. On the other hand, tightening can be desired in order to absorb the increased torque by immediate tightening of the clamping set to a greater extent. In the same direction of rotation, the effect of the torque support 70 can be changed by the clamping set being turned around and by the torque support 70 being attached on the other axial side of the outer component 3.

A torque support can also be realized by leaving the tool 50 (FIG. 8, for example) on the screw ring 30 after tightening and connected to the outer component 3 in such a way as to be rotatably fixed by means of a screw which is attached outside the wrench jaw 51 and passes through the bore 71' (indicated by a broken line).

The thickness of the torque support, however, should not be too small so that the screw ring can also be reliably gripped in the longitudinal direction at different positions.

It should become obvious to those skilled in the art that the present invention is not limited to the preferred embodiments shown and described.

What is claimed is:

1. A clamping set for transmitting forces between an inner component, having a cylindrical outer peripheral surface, and at least one outer component arranged thereon, said outer component having a recess forming a cylindrical inner peripheral surface, said clamping set comprising:

an inner taper ring having a cylindrical inner peripheral surface adapted to bear on the outer peripheral surface of the inner component, and having a tapered outer peripheral surface;

an outer taper ring with an outer peripheral surface adapted to bear against the cylindrical inner peripheral surface of the recess, and having a tapered inner peripheral surface adapted to interact with the tapered outer peripheral surface of the inner taper ring;

said inner and outer taper rings tapering from respective thin-walled ends to thick-walled ends; and a screw ring adapted to be screwed onto a threaded portion of the inner taper ring, said screw ring having a radially inwardly projecting peripheral collar which grips behind a radially outwardly projecting peripheral collar of the outer taper ring;

wherein the peripheral projecting collar of the outer taper ring is disposed at the thin-walled end of the outer taper ring and projects radially outward beyond said outer peripheral surface of the outer taper ring, which outer peripheral surface is located toward the thick-walled end of the outer taper ring;

wherein the threaded portion of the inner taper ring is provided on the thick-walled end of the inner taper ring and projects radially outward beyond the outer peripheral surface of the outer taper ring and beyond the outer peripheral surface of the projecting peripheral collar;

and further comprising:

first hydraulic piston/cylinder units distributed over the periphery of said screw ring on a bearing surface which faces the projecting peripheral collar of the outer taper ring;

said bearing surface forming a portion of radially inwardly projecting peripheral collar of the screw ring;

the pistons of the piston/cylinder units being adapted to abut a bearing surface of the projecting peripheral collar of the outer taper ring.

2. The clamping set as claimed in claim 1, further comprising:

second hydraulic piston/cylinder units, distributed over the periphery of the radially inwardly projecting peripheral collar of the screw ring facing the outer component;

the pistons of the piston/cylinder units being adapted to abut a facing front end of the outer component.

3. The clamping set as claimed in claim 1, wherein the inner periphery of the radially inwardly projecting peripheral collar of the screw ring defines a radial clearance relative to the outer periphery of the outer taper ring.

4. The clamping set as claimed in claim 1, wherein the bearing surfaces of the outer taper ring and the screw ring are bevelled so that the outer taper ring, in the area of its peripheral collar, is subjected to a radially inwardly directed force component when the clamping set is tightened.

5. The clamping set as claimed in claim 4, wherein the angle of the bevel is about 45°.

6. A clamping set for transmitting forces between an inner component, having a cylindrical outer peripheral surface, and at least one outer component arranged thereon, said outer component having a recess forming a cylindrical inner peripheral surface, said clamping set comprising:

an inner taper ring having a cylindrical inner peripheral surface adapted to bear on the outer peripheral surface of the inner component, and having a tapered outer peripheral surface;

an outer taper ring with an outer peripheral surface adapted to bear against the cylindrical inner peripheral surface of the recess, and having a tapered inner peripheral surface adapted to interact with the tapered outer peripheral surface of the inner taper ring;

said inner and outer taper rings tapering from respective thin-walled ends to thick-walled ends; and a screw ring adapted to be screwed onto a threaded portion of the inner taper ring, said screw ring having a radially inwardly projecting peripheral collar which grips behind a radially outwardly projecting peripheral collar of the outer taper ring;

wherein the peripheral projecting collar of the outer taper ring is disposed at the thin-walled end of the outer taper ring and projects radially outward beyond said outer peripheral surface of the outer taper ring, which outer peripheral surface is located toward the thick-walled end of the outer taper ring;

wherein the threaded portion of the inner taper ring is provided on the thick-walled end of the inner taper ring and projects radially outward beyond the outer peripheral surface of the outer taper ring and beyond the outer peripheral surface of the projecting peripheral collar; and wherein a turning tool is provided which is supported on a pin on the outer component and acts on the periphery of the screw ring.

7. The clamping set as claimed in claim 6, wherein the turning tool comprises a toothed pinion having a pitch circle diameter which is substantially smaller than the outside diameter of the screw ring.

8. The clamping set as claimed in claim 7, wherein the screw ring has a tooth system on the outer periphery thereof corresponding to a tooth system of the pinion.

9. The clamping set as claimed in claim 7, further comprising a tool adapted to be placed onto the screw ring in a rotationally fixed manner, said tool having a tooth system on the periphery thereof.

10. The clamping set as claimed in claim 9, wherein the tool can be placed onto the screw ring in various angular positions, and the tooth system covers a circular arc corresponding to at least one angular step.

11. The clamping set as claimed in claim 7, wherein an axially parallel bore is defined in the outer component in which the pinion is rotatable about the pin.

12. A clamping set for transmitting forces between an inner component, having a cylindrical outer peripheral surface, and at least one outer component arranged thereon, said outer component having a recess forming a cylindrical inner peripheral surface, said clamping set comprising:

an inner taper ring having a cylindrical inner peripheral surface adapted to bear on the outer peripheral surface of the inner component, and having a tapered outer peripheral surface;

an outer taper ring with an outer peripheral surface adapted to bear against the cylindrical inner peripheral surface of the recess, and having a tapered inner peripheral surface adapted to interact with the tapered outer peripheral surface of the inner taper ring;

said inner and outer taper rings tapering from respective thin-walled ends to thick-walled ends; and a screw ring adapted to be screwed onto a threaded portion of the inner taper ring, said screw ring having a radially inwardly projecting peripheral collar which grips behind a radially outwardly projecting peripheral collar of the outer taper ring;

a device which is provided on said screw ring and which rotatably fixes the screw ring to the outer component, wherein the device comprises a plate having a cut-out portion defined therein;

said device being adapted to fit the outer periphery of the screw ring, and said plate having a perforation defined outside the cut-out portion which is adapted to receive a bolt which engages into the outer component;

wherein the peripheral projecting collar of the outer taper ring is disposed at the thin-walled end of the outer taper ring and projects radially outward beyond said outer peripheral surface of the outer taper ring, which outer peripheral surface is located toward the thick-walled end of the outer taper ring;

wherein the threaded portion of the inner taper ring is provided on the thick-walled end of the inner taper ring and projects radially outward beyond the outer peripheral surface of the outer taper ring and beyond the outer peripheral surface of the projecting peripheral collar; and wherein the inner and the outer taper rings have a radially continuous longitudinal slot at least in the area of the tapered surfaces.

13. The clamping set as claimed in claim 12, wherein the device is formed by a tool which has defined therein an additional perforation for a bolt engaging into the outer component to pass through.

14. A clamping set for transmitting forces between an inner component, having a cylindrical outer peripheral surface, and at least one outer component arranged thereon, said outer component having a recess forming a cylindrical inner peripheral surface, said clamping set comprising:

an inner taper ring having a cylindrical inner peripheral surface adapted to bear on the outer peripheral surface of the inner component, and having a tapered outer peripheral surface;

an outer taper ring with an outer peripheral surface adapted to bear against the cylindrical inner peripheral surface of the recess, and having a tapered inner peripheral surface adapted to interact with the tapered outer peripheral surface of the inner taper ring;

said inner and outer taper rings tapering from respective thin-walled ends to thick-walled ends; and a screw ring adapted to be screwed onto a threaded portion of the inner taper ring, said screw ring having a radially inwardly projecting peripheral collar which grips behind a radially outwardly projecting peripheral collar of the outer taper ring;

wherein the peripheral projecting collar of the outer taper ring is disposed at the thin-walled end of the outer taper ring and projects radially outward beyond said outer peripheral surface of the outer taper ring, which outer peripheral surface is located toward the thick-walled end of the outer taper ring;

wherein the threaded portion of the inner taper ring is provided on the thick-walled end of the inner taper ring and projects radially outward beyond the outer peripheral surface of the outer taper ring and beyond the outer peripheral surface of the projecting peripheral collar; and wherein the inner taper ring has a radially outwardly projecting peripheral margin on the outer periphery of which the threaded portion is formed and has defined therein axial tapped through-holes adapted to receive withdrawal screws; said through-holes being disposed adjacent a front surface of the outwardly projecting peripheral collar of the outer taper ring.

15. A clamping set for transmitting forces between an inner component, having a cylindrical outer peripheral surface, and at least one outer component arranged thereon, said outer component having a recess forming a cylindrical inner peripheral surface, said clamping set comprising:

an inner taper ring having a cylindrical inner peripheral surface adapted to bear on the outer peripheral surface of the inner component, and having a tapered outer peripheral surface;

an outer taper ring with an outer peripheral surface adapted to bear against the cylindrical inner peripheral surface of the recess, and having a tapered inner peripheral surface adapted to interact with the tapered outer peripheral surface of the inner taper ring;

said inner and outer taper rings tapering from respective thin-walled ends to thick-walled ends; and a screw ring adapted to be screwed onto a threaded portion of the inner taper ring, said screw ring having a radially inwardly projecting peripheral collar which grips behind a radially outwardly projecting peripheral collar of the outer taper ring;

wherein the peripheral projecting collar of the outer taper ring is disposed at the thin-walled end of the outer taper ring and projects radially outward beyond said outer peripheral surface of the outer taper ring, which outer peripheral surface is located toward the thick-walled end of the outer taper ring;

wherein the threaded portion of the inner taper ring is provided on the thick-walled end of the inner taper ring and projects radially outward beyond the outer peripheral surface of the outer taper ring and beyond the outer peripheral surface of the projecting peripheral collar; and wherein the recess of the outer component has an internal thread, the outer taper ring has an external thread on the outer periphery thereof, and the outer component is adapted to be screwed onto the outer taper ring.

16. A clamping set for transmitting forces between an inner component, having a cylindrical outer peripheral surface, and at least one outer component arranged thereon, said outer component having a recess forming a cylindrical inner peripheral surface, said clamping set comprising:

an inner taper ring having a cylindrical inner peripheral surface adapted to bear on the outer peripheral surface of the inner component, and having a tapered outer peripheral surface;

an outer taper ring with an outer peripheral surface adapted to bear against the cylindrical inner peripheral surface of the recess, and having a tapered inner peripheral surface adapted to interact with the tapered outer peripheral surface of the inner taper ring;

said inner and outer taper rings tapering from respective thin-walled ends to thick-walled ends; and a screw ring adapted to be screwed onto a threaded portion of the inner taper ring, said screw ring having a radially inwardly projecting peripheral collar which grips behind a radially outwardly projecting peripheral collar of the outer taper ring;

wherein the peripheral projecting collar of the outer taper ring is disposed at the thin-walled end of the outer taper ring and projects radially outward beyond said outer peripheral surface of the outer taper ring, which outer peripheral surface is located toward the thick-walled end of the outer taper ring;

wherein the threaded portion of the inner taper ring is provided on the thick-walled end of the inner taper ring and projects radially outward beyond the outer peripheral surface of the outer taper ring and beyond the outer peripheral surface of the projecting peripheral collar; and wherein the clamping set is symmetrical about a center plane perpendicular to the axis of the inner component and further comprises a second inner taper ring integral with said inner taper ring thereby to form an inner double taper ring; said inner double taper ring having two outer taper rings arranged thereon and two screw rings.

17. A clamping set for transmitting forces between an inner component, having a cylindrical outer peripheral surface, and at least one outer component arranged thereon, said outer component having a recess forming a cylindrical inner peripheral surface, said clamping set comprising:

an inner taper ring having a cylindrical inner peripheral surface adapted to bear on the outer peripheral surface of the inner component, and having a tapered outer peripheral surface;

an outer taper ring with an outer peripheral surface adapted to bear against the cylindrical inner peripheral surface of the recess, and having a tapered inner peripheral surface adapted to interact with the tapered outer peripheral surface of the inner taper ring;

said inner and outer taper rings tapering from respective thin-walled ends to thick-walled ends; and a screw ring adapted to be screwed onto a threaded portion of the inner taper ring, said screw ring having a radially inwardly projecting peripheral collar which grips behind a radially outwardly projecting peripheral collar of the outer taper ring;

a device which is provided on said screw ring and which rotatably fixes the screw ring to the outer component;

wherein the peripheral projecting collar of the outer taper ring is disposed at the thin-walled end of the outer taper ring and projects radially outward beyond said outer peripheral surface of the outer taper ring, which outer peripheral surface is located toward the thick-walled end of the outer taper ring;

wherein the threaded portion of the inner taper ring is provided on the thick-walled end of the inner taper ring and projects radially outward beyond the outer peripheral surface of the outer taper ring and beyond the outer peripheral surface of the projecting peripheral collar; and wherein the inner and the outer taper rings have a radially continuous longitudinal slot at least in the area of the tapered surfaces.

* * * * *